F. B. TORREY.
Lubricating-Journal.

No. 215,696. Patented May 20, 1879.

UNITED STATES PATENT OFFICE.

FRANCIS B. TORREY, OF BATH, MAINE.

IMPROVEMENT IN LUBRICATING JOURNALS.

Specification forming part of Letters Patent No. 215,696, dated May 20, 1879; application filed April 11, 1879.

*To all whom it may concern:*

Be it known that I, FRANCIS B. TORREY, of Bath, Sagadahoc county, Maine, have invented an Improvement in Devices for Lubricating Journals, of which the following is a specification.

My invention relates to the lubrication of journals, and is specially adapted to journals for sheaves and the like, although it may be used advantageously with larger journals in other connections.

It consists in forming the surface of the journal with perforations or pockets adapted to receive and to hold lubricating material, so as to furnish a supply of the said lubricating material to the bearing-surfaces, thereby obviating the necessity for frequent oiling.

In the drawing is represented a perspective view of a journal adapted to an ordinary sheave of a pulley and provided with my improvement.

The part of the journal represented at $a$ has its bearing in the shell or case in which it is supported without turning. The part represented by $b$ is the bearing of the sheave or wheel. It is formed with perforations $d\ d$, of a size adapted to receive the lubricating material without seriously weakening the journal, and without reducing to too great an extent the bearing-surface.

The form of the orifices and their arrangement upon the shaft or journal are not material, provided the purpose of these holes be kept in view, and they are arranged so as to furnish lubricating material to all the parts of the journal which come in contact with the moving surfaces of the sheave or wheel. The lubricating material is applied directly to the journal after it is removed from the sheave or wheel, and when the journal is properly supplied with its lubricant it is placed in position, or the wheel or sheave is placed upon it, and the parts are ready for use.

The journals thus made and properly supplied with lubricant will work very much longer without reoiling than the ordinary plain journals.

The lubricating device itself is simple and inexpensive, and is applicable to positions, such as journals for the sheaves of blocks, where it would be impracticable to use any of the ordinary kinds of lubricating apparatus.

Having thus described my invention, what I claim, and desire to secure by Letters Patent of the United States, is—

A journal for sheaves and like purposes, formed with indentations or pockets upon its bearing-surface, as and for the purpose set forth.

In testimony whereof I have signed my name to this specification in the presence of two subscribing witnesses.

FRANCIS B. TORREY.

Witnesses:
 J. W. HAMILTON JOHNSON,
 F. L. MIDDLETON.